(12) United States Patent
Sakai et al.

(10) Patent No.: US 7,801,419 B2
(45) Date of Patent: Sep. 21, 2010

(54) MULTIMEDIA REPRODUCTION DEVICE AND MENU SCREEN DISPLAY METHOD

(75) Inventors: Masaharu Sakai, Tokyo (JP); Kojiro Umemura, Kanagawa (JP); Shuji Hiramatsu, Tokyo (JP); Ryuji Nakayama, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 932 days.

(21) Appl. No.: 10/587,406

(22) PCT Filed: Apr. 1, 2005

(86) PCT No.: PCT/JP2005/006506
§ 371 (c)(1),
(2), (4) Date: Jan. 3, 2007

(87) PCT Pub. No.: WO2005/109157
PCT Pub. Date: Nov. 17, 2005

(65) Prior Publication Data
US 2007/0160345 A1    Jul. 12, 2007

(30) Foreign Application Priority Data
May 10, 2004    (JP)    ............................ 2004-140416
Dec. 3, 2004    (JP)    ............................ 2004-352050

(51) Int. Cl.
*H04N 5/00* (2006.01)
*H04N 7/00* (2006.01)
(52) U.S. Cl. ........................................ 386/125; 386/46
(58) Field of Classification Search ................ 386/125, 386/124, 126, 45, 46, 52, 68
See application file for complete search history.

(56) References Cited

U.S. PATENT DOCUMENTS

2003/0147030 A1    8/2003    Sone (Continued)

FOREIGN PATENT DOCUMENTS

JP    3-214220 A    9/1991

(Continued)

OTHER PUBLICATIONS

Decision of Rejection dated Sep. 19, 2008, from the corresponding Chinese Application.

(Continued)

*Primary Examiner*—Robert Chevalier
(74) *Attorney, Agent, or Firm*—Katten Muchin Rosenman LLP

(57) ABSTRACT

A small-size digital device requires preferable operability and user-friendliness of the user interface. In a multimedia reproduction device (10), an operation unit (40) acquires an instruction concerning content reproduction via a user operation. A read-out unit (44) reads out a content from an external recording medium mounted as a content data storage area. A storage unit (80) holds data on a plurality of function icons symbolizing a plurality of content reproduction function types and data on a plurality of media icons symbolizing the external recording medium types. A display processing unit (46) processes menu screen display and content reproduction. A menu control unit (48) generates image data on a menu screen where a plurality of function icons and a plurality of media icons are arranged two-dimensionally according to a user instruction.

20 Claims, 9 Drawing Sheets

U.S. PATENT DOCUMENTS

2005/0195308 A1* 9/2005 Miyashita .............. 348/333.01
2006/0051050 A1* 3/2006 Ning .......................... 386/46

FOREIGN PATENT DOCUMENTS

| JP | 2002-287950 | 10/2002 |
| JP | 2003-942 A | 1/2003 |
| JP | 2003-230080 A | 8/2003 |

OTHER PUBLICATIONS

International Preliminary Examination Report on Patentability for the related International Application No. PCT/JP2005/006506.

Notification of Reason(s) for Refusal dated May 13, 2008 for corresponding Japanese Patent Application No. 2006-512929.

"Instructions manuals for PSX DVD-HDD recorder", 2003, pp. 38-41, 54-57, Sony Corporation.

"PSX as recording equipment", Jan. 19, 2004, pp. 108-115, vol. 449, Nikkei Personal Computing.

Notice of Preliminary Rejection mailed Nov. 16, 2007, from the corresponding Korean Application.

First Office Action dated Feb. 1, 2008, from the corresponding Chinese Application.

* cited by examiner

MULTIMEDIA REPRODUCTION DEVICE AND MENU SCREEN DISPLAY METHOD

This application is a National Phase Application of International Application No. PCT/JP2005/006506, filed Apr. 1, 2005, which claims the benefit under 35 U.S.C. 119 (a-e) of Japanese Application No. 2004-140416 filed May 10, 2004, and Japanese Application No. 2004-352050 filed Dec. 3, 2004 which is herein incorporated by reference.

BACKGROUND OF THE INVENTION

1. Field of the Invention

The present invention relates to a multimedia player and a method of displaying on-screen menu. More particularly, the present invention relates to a technology related to user interface in an on-screen menu to give an instruction for multimedia playback.

2. Description of the Related Art

Recently, digital home appliances such as a hard disk recorder, a digital versatile disk (DVD) recorder, a multiple function hard disk recorder and a digital camera, etc. have become widely available. The growing availability of these products not only stimulates needs for products themselves but also increases demand for digital contents such as movies, music and games and, as such, is expected to boost the economy.

A majority of digital home appliances are assumed to be used in a sitting room. To further stimulate needs for products and contents, however, it is considered necessary to make available devices that allow contents to be enjoyed regardless of where users are. In order to address the needs, user interface with operability and ease of use comparable to that of digital home appliances using a television screen as a means of display are highly demanded.

SUMMARY OF THE INVENTION

Accordingly, a general purpose of the present invention is to enhance user convenience in multimedia playback.

A multimedia player according to at least one embodiment of the present invention, which is capable of playing back digital contents, comprises: a control which acquire an instruction related to playback of a content via a user's instruction; a reader which reads the content from an external storage medium installed in the multimedia player to serve as an area for storing data for the content; a storage which stores data for a plurality of function icons representing respective types of playback functions for playing back respective types of contents, and data for a plurality of medium icons representing respective types of external storage mediums that can be installed in the multimedia player; a display processor which displays an on-screen menu related to playback of the content and processes playback of the content thus read; and a menu controller which generates image data for the on-screen menu in which the plurality of function icons and at least one of the plurality of medium icons are arranged in a two-dimension array.

The reader reads, from the external storage medium installed in the multimedia player, a menu item image visually representing a summary of the content stored in the external storage medium, before a user provides an instruction to playback the content. The menu controller places the multiple function icons in a first direction on a screen, places the medium icons in a second direction that crosses the first direction on the screen, visually highlights the medium icon located in the neighborhood of an intersection between an array in the first direction and an array in the second direction as a focus of attention, and displays the menu item image read from the external storage medium corresponding to the highlighted medium icon, in the neighborhood of the highlighted medium icon, before the user provides an instruction to playback the content.

The phrases "digital content" and "content" refer to information including moving image data, audio data, text data and program data that are played back, displayed or run by multiple information conveying means. The content may include information to be enjoyed as entertainment such as a movie, photo, music and game created in a digital data format. The phrase "external storage medium" may include a detachable storage medium such as an optical disk or a memory card.

According to this embodiment, contents are displayed in an on-screen menu in an apparatus for playing back contents, categorized according to the playback function and storage medium. A user selects a desired content from the multiple contents. If the multiple contents are arranged in the on-screen menu to fill the entire screen, it might give a disorganized appearance. In this embodiment, the contents are categorized according to the types of playback functions and storage mediums and are placed in a two-dimensional array. Therefore, a disorganized appearance does not result. Categorization according to the types of playback functions and storage mediums coveys to the user a two-dimensional depth in arrangement. This can offer to the user an intuitive interface for selecting a content.

A method of displaying an on-screen menu by an apparatus capable of playing back digital contents, according to at least one embodiment of the present invention, comprises: reading a content from an external storage medium installed in the apparatus to serve as an area for storing data for the content played back in the apparatus; reading, from a predetermined storage, data for a plurality of function icons representing respective types of playback functions for playing back respective types of contents, and data for a plurality of medium icons representing respective types of external storage mediums that can be installed in the apparatus; and displaying an on-screen menu related to playback of the content and playing back the content read; generating image data for the on-screen menu in which the plurality of function icons and at least one of the plurality of medium icons are arranged in a two-dimensional array.

The reading reads, from the external storage medium installed in the apparatus, a menu item image visually representing a summary of the content stored in the external storage medium, before a user provides an instruction to playback the content, and The generating places the multiple function icons in a first direction on a screen, places the medium icons in a second direction that crosses the first direction on the screen, visually highlights the medium icon located in the neighborhood of an intersection between an array in the first direction and an array in the second direction as a focus of attention, and displays the menu item image read from the external storage medium corresponding to the highlighted medium icon in the neighborhood of the highlighted medium icon, before the user provides an instruction to playback the content.

According to this embodiment, contents are displayed in an on-screen menu in an apparatus for playing back contents, categorized according to the playback function and storage medium. A user selects a desired content from the multiple contents. This embodiment also offers an intuitive interface for selecting a content since the contents are categorized according to the types of playback functions and storage mediums and are placed in a two-dimensional array so that a disorganized appearance does not result.

DETAILED DESCRIPTION OF THE INVENTION

A multimedia player according to one embodiment of the present invention is a mobile multifunction device capable of playing back or running multiple types of contents such as still images, moving images, music and games. The device has a small, built-in liquid crystal panel. To manipulate the device, a user uses displayed contents and keys like arrow keys. Normally, when multiple types of contents are reproduced on a computer, each content is reproduced using a program such as a viewer dedicated to the content type. These dedicated programs are produced by different vendors. Normally, they do not share a common interface nor provide consistent feel as the user uses the programs.

A multimedia player according to the embodiment employs a common user interface to handle playback of multiple types of contents in an integrated manner, so as to offer vendor-independent operability to users. An on-screen menu does not display multiple types of contents stored in multiple storage mediums at a time. Instead, icons and menu item images suggesting contents are displayed, categorized according to the types of contents and storage mediums. More specifically, icons representing the types of playback functions such as movie playback, photo playback, music playback and running of a game are displayed horizontally. Icons representing the types of storage mediums such as optical disk or memory card, and icons representing the contents stored in these mediums are displayed vertically. This allows the user to search for and select a desired content easily in a relatively small screen. Moreover, user convenience is enhanced by offering an interface that embodies viewability and operability that appeal to the user's intuition.

Figure 1:
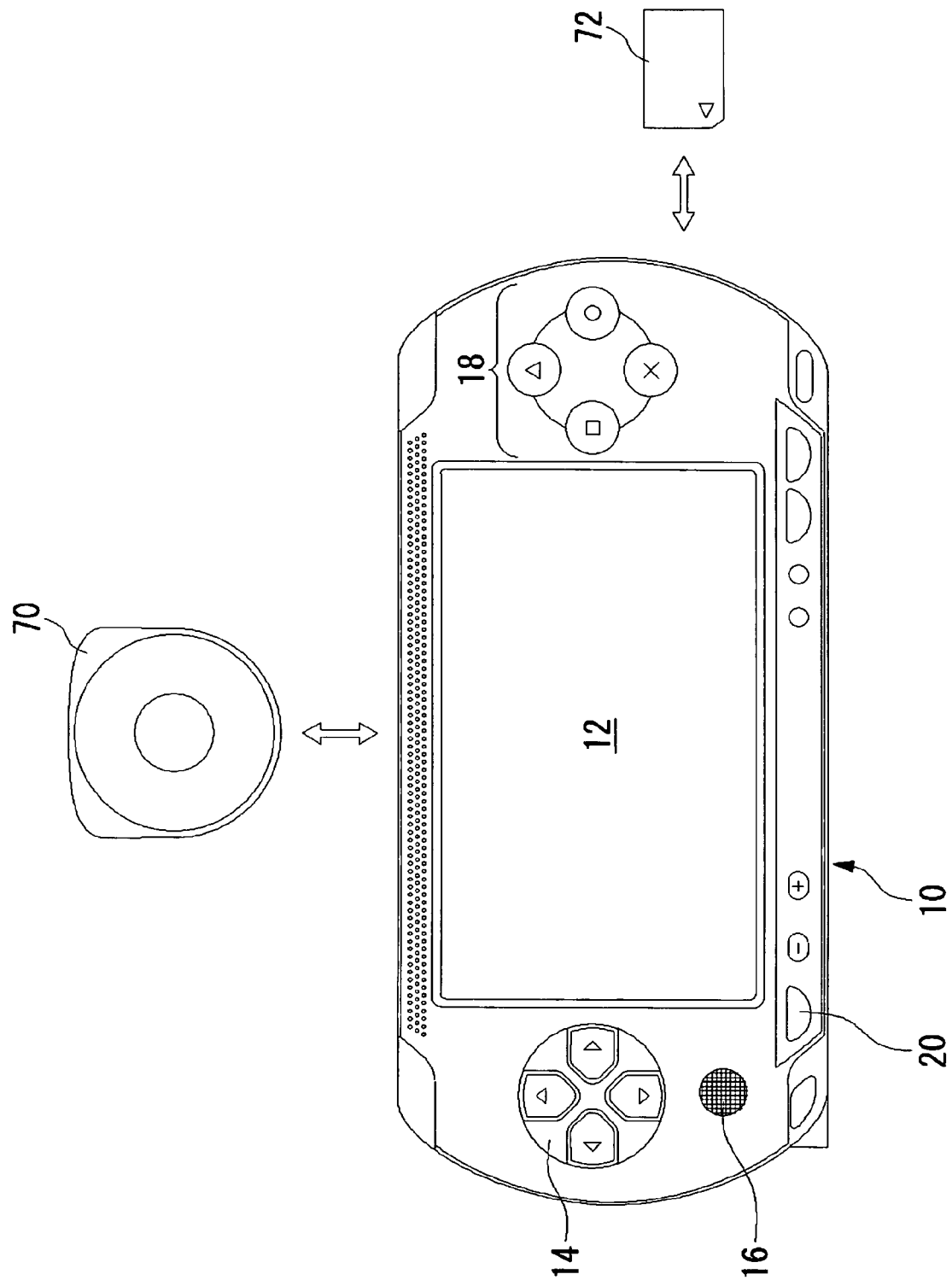
FIG. 1 shows the appearance of a multimedia player.

FIG. 1 shows the appearance of a multimedia player. A multimedia player 10 is a mobile electronic appliance and is capable of playing back digital contents such as moving images, still images and music. In addition, the player 10 is capable of running contents like a game program. Each content is primarily read from an external storage medium detachable from the multimedia player 10. The external storage medium in this embodiment is a small optical disk 70 and a memory card 72. The small optical disk 70 and the memory card 72 are mounted on a drive (not shown) provided in the multimedia player 10. The small optical disk 70 is a read-only optical disk having a storage capacity of about several GB formed. An optical disk of a diameter smaller than that of CD-ROM or DVD-ROM is accommodated in a protective cartridge. The small optical disk 70 is not only capable of storing music data and still image data but also storing moving image data such as a movie characterized by a relatively large data size. The memory card 72 is a small memory card which can also be detachably installed in a digital camera or a cell phone. The memory card 72 primarily stores still image data, moving image data, audio data, etc., prepared by the user by using another device or data exchanged between devices.

The multimedia player 10 is provided with a liquid crystal display 12 and keys including directional buttons 14, an analog stick 16, buttons 18, a home button 20 and the like. The user holds the right and left ends of the multimedia player 10 with both hands. The directional buttons 14 or the analog stick 16 is accessed primarily by the left thumb to specify up/down/left/right movement. The buttons 18 are accessed primarily by the right thumb to provide various instructions. Unlike the directional buttons 14 and the buttons 18, the home button 20 is provided at a position not likely to be pressed by any finger when the left and right ends of the multimedia player 10 are held with both hands, thereby preventing false operations. The liquid crystal display 12 displays an on-screen menu with graphical user interface explained later with reference to FIG. 2, etc. as well as displaying a content while it is being played back. The multimedia player 10 is also provided with a USB port, an infrared port, wireless LAN functions, for data exchange with other devices using the ports and the communication functions.

Figure 2:
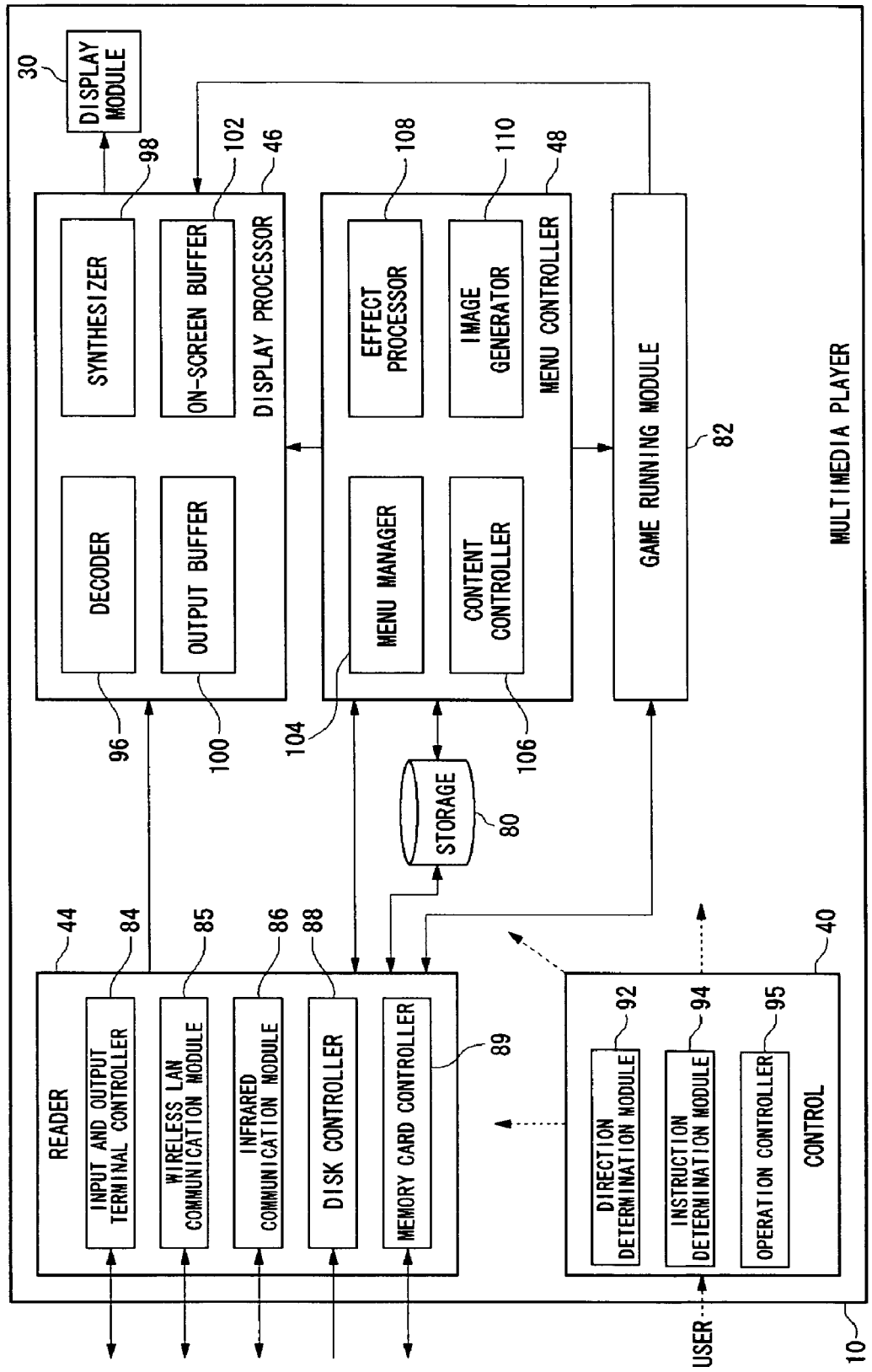
FIG. 2 is a functional block diagram showing the structure of the multimedia player.

FIG. 2 is a functional block diagram showing the structure of the multimedia player. The multimedia player 10 comprises a control 40, a reader 44, a display processor 46, a menu controller 49, a display module 30, a storage 80 and a game running module 82. The multimedia player 10 is implemented hardwarewise by a CPU, RAM, ROM, a rendering circuit, etc., and softwarewise by a program implementing the functions of data input, data latch, image processing, rendering, etc. FIG. 2 depicts functional blocks implemented by coordination of hardware and software. Therefore, the functional blocks may be implemented by a variety of manners using a combination of hardware and software. The components are controlled in accordance with user operation via the control 40.

The control 40 includes a direction determination module 92, an instruction determination module 94 and an operation controller 95. The control 40 acquires an instruction related to playback of content given by a user's operation. The direction determination module 92 acquires instructions related to up/down/left/right directions entered by the user via the directional buttons 14 or the analog joystick 16. The instruction determination module 94 acquires user-input instructions such as "start playback", "pause playback", "select", "cancel selection", "invoke on-screen menu" via the buttons 18 and the home button 20. The instruction determination module 94 acquires each depression of the home button 20 as an instruction to switch between display and non-display of an on-screen menu. Moreover, the instruction determination module 94 acquiring an instruction for termination of playback or execution of content recognizes that an instruction to return to the menu is simultaneously given. The direction determination module 92 and the instruction determination module 94 is embodied by a combination of multiple buttons, a circuit for detecting depression of a button and a program for recognizing the detection.

The operation controller 95 controls the reader 44, the display processor 46, the menu controller 48, the game running module 82 and the display module 30 in accordance with an instruction acquired by the direction determination module 92 and the instruction determination module 94. The display module 30 displays an on-screen menu and images resulting from playing back contents on the liquid crystal display 12.

The reader 44 includes an input and output terminal controller 84, a wireless LAN communication module 85, an infrared communication module 86, a disk controller 88 and a memory card controller 89. The reader 44 primarily reads a content from the external storage medium installed the multimedia player 10 as an area for storing contents for playback. The disk controller 88 reads contents such as a movie and music from the small optical disk 70. The memory card controller 89 reads contents such as an image and music from the memory card 72 and writes data such as back-up data in a game program in the memory card 72. The input and output terminal controller 84 handles input and output of data between the multimedia player 10 and another USB-connected device. The wireless LAN communication module 85 is responsible for data transmission and reception to and from another device over wireless LAN such as IEEE 802.11a/b/g. The infrared communication module 86 transmits and receives data to and from another device through infrared communication such as IrDA.

The disk controller 88 and the memory card controller 89 read a menu item image for a content from the small optical disk 70 or the memory card 72 before the user provides an instruction for playback of content. The menu item image is an image visually showing a summary of the content. For example, the image includes a title, data size, playback time, time of production, description of content, thumbnail and the like. The menu item image is generated according to a predetermined rule related to image size. The image comprises a foreground image visually representing a summary of the content and a background image used as a background. Only one of the foreground image and the background image may be stored as a menu item image in the small optical disk 70 or the memory card 72. Alternatively, multiple foreground images or background images may be stored. It is up to a content producer to choose the number of images stored.

The disk controller 88 and the memory card controller 89 read content icons indicating the contents from the small optical disk 70 or the memory card 72 before the user provides an instruction for playback of content. A content icon is a pictorial or graphical representation of the content to make it distinguishable from other contents. The icon may be a moving image icon generated in a moving image format and a still image icon generated in a still image format. A moving image icon is a collection of moving image data and audio data. Audio data may be stored in the header area of a moving image icon. The disk controller 88 and the memory card controller 89 may generate thumbnails from images included in the contents stored in the small optical disk 70 or the memory card 72 so that the thumbnails are acquired as content icons. According to one variation, a moving image icon may comprise moving image data that does not include audio data. In that case, an audio file corresponding to the moving image icon may be stored in the same directory. An index file stored in that directory may define correspondence between the moving image icon and the audio file. Correspondence between a moving image icon and an audio file may be defined by a fine name instead of using an index file. More specifically, the filename portion excluding the file's extension may be a character string common to a moving image icon and an audio file, denoting correspondence between them. Alternatively, au audio file may be identified by a special fine name.

When another device connects to the multimedia player 10 via USB, wireless LAN or infrared, the input and output controller 84, the wireless LAN communication module 85 and the infrared communication module 86 acquire from the connecting device menu item images for contents and content icons, as the disk controller 88 and the memory card controller 89 do.

The storage 80 maintains data for multiple function icons and multiple medium icons. The multiple function icons represent multiple types of playback functions for playing back respective types of contents. The multiple medium icons represent the types of external storage mediums installable in the multimedia player 10. Function icons stored in the storage 80 include an icon representing a photo playback function, an icon representing music playback function, an icon representing a moving image playback function, an icon representing a game running function and an icon representing various configuration functions. Medium icons stored in the storage 80 include an icon representing the small optical disk 70 and an icon representing the memory card 72. The storage 80 also stores content icons read by the reader 44, content icons generated from the contents read by the reader 44 and common icons prepared in advance and common to those contents for which corresponding content icons have not been acquired.

The storage 80 further stores user-configured restriction configuration data. The restriction configuration data designates whether to activate access restriction which is imposed on the small optical disk 70 or selected contents to designate a certain level of access restriction. More specifically, the restriction configuration data includes configuration related to the level of activation of access restriction. The level of activation established in the restriction configuration data and the level of restriction established in a content are compared. If the level of restriction is lower than the level of activation, playback or running of the content is permitted. If it is desired that access restriction be turned off, the access restriction function may be turned off or the least stringent level of activation may be established. Whatever level of activation may be established, a password is also created by the user for lifting access restriction and is stored in the restriction configuration data.

The display processor 46 includes a decoder 96, a synthesizer 98, an output buffer 100 and an on-screen buffer 102. The display processor 46 displays an on-screen menu related to playback of content and plays back the content read from the storage medium. The decoder 96 decodes coded data like moving image data, still image data, audio data and the like read from the small optical disk 70 or the external storage medium such as the memory card 72, in accordance with the user's instruction acquired by the control 40. If encrypted data is stored in the small optical disk 70 or the memory card 72, decryption of the encrypted data is also performed by the decoder 96. The decoder 96 stores the decoded playback data in the output buffer 100. The output buffer 100 temporarily stores the playback data before sending it to the display module 30. The on-screen buffer 102 temporarily stores the image data for on-screen display before outputting the same to the display module 30. The image data for on-screen display may be the image data for an on-screen menu generated by the menu controller 48. Physically, the output buffer 100 and the on-screen buffer 102 may be embodied in a single buffer memory or separate buffer memories.

A synthesizer 98 synthesizes the playback data stored in the output buffer 100 and the image data for on-screen display stored in the on-screen buffer 102 and sends the synthesized data to the display module 30. The display module 30 displays the data sent from the synthesizer 98 on the liquid crystal display 12.

The menu controller 48 includes a menu manager 104, a content controller 106, an effect processor 108 and an image generator 110. The menu controller 48 generates image data for an on-screen menu. The menu manager 104 manages the types of playback functions and types of storage mediums as menu items. The menu manager 104 stores items of contents read from the small optical disk 70 or the memory card 72 and also stores current selections of a playback function type, storage medium type and content item. The menu manager 104 also stores correspondence between the contents stored in the storage mediums and the playback functions for playing back the contents. For example, given that the small optical disk 70 stores a content corresponding to the moving image playback function and a content corresponding to the music playback function, the menu manager 104 stores correspondence between the function, the storage medium and the contents.

The content controller 106 controls the start of the reading of a content from the external storage medium and the start of the playback or running of the content, in accordance with the user's instruction acquired by the control 40. The effect processor 108 processes operations related to icons in an on-screen menu. For example, the effect processor 108 scrolls, enlarges or reduces icons. If an icon is a moving image icon, the effect processor 108 processes the playback of the moving image.

The image generator 110 generates image data for an on-screen menu in accordance with the user's instruction acquired by the control 40. Multiple function icons and at least medium icon are arranged in a menu in a two-dimensional array. For example, the image generator 110 arranges multiple function icons in a horizontal direction and medium icons in a vertical direction. These two arrays intersect each other practically at the center of the screen. The image generator 110 visually highlights the function icon and the medium icon that are displayed at the intersection and in the neighborhood of the intersection as focuses of attention. Since icons in focus of attention are displayed practically at the center of the screen, only minimum effort is required of the user to turn his or her eyes to a target when, for example, switching to the on-screen menu while a content is being reproduced. The image data for the on-screen menu generated by the image generator 110 is sent to the on-screen buffer 102.

The effect processor 108 scrolls the array of function icons horizontally when the direction determination module 92 acquires a user's instruction to move left or right. The effect processor 108 scrolls the array of medium icons vertically when the direction determination module 92 acquires an instruction to move up or down. If there is only one medium icon to be displayed, vertical scrolling is not activated. The icons are scrolled such that the intersection between the horizontal array and the vertical array remains at a predetermined position. Because the intersection between the two arrays of icons remains fixed at the predetermined position on the screen so that contents in focus remain displayed at the same position, the user need not move his or her eyes to locate the content in focus. The inventive method also helps the user see the whole picture composed of a large number of contents.

The effect processor 108 highlights function icons and medium icons in focus. An icon may be highlighted by a format of representation different from that the other icons. For example, an icon may be highlighted by a distinguishing color, change in color, enlarged view or transition to an enlarged view.

The image generator 110 places a menu item image read from the external storage medium corresponding to a highlighted medium icon, in the neighborhood of the medium icon before the user provide an instruction for playback of the content. This enhances user convenience by allowing the user to know a summary of the content before playing back the content. The image generator 110 generates image data for the on-screen menu by visually blending the menu item image with an array of function icons and an array of medium icons. For example, assuming that a menu item image comprises a foreground image and a background image, the image generator 110 superimposes an array of icons over the background image and then superimposes the foreground image over the icons. As a result, the foreground image, the background image and the array of icons are visually blended without interfering each other.

The image generator 110 places the content icon read from the external storage medium at the position of the medium icon or in the neighborhood thereof. The image generator 110 places an icon in an moving image format to highlight a content as a focus of attention. The rest of the contents are represented by placing content icons in a still image format. Details of the layout of the icons will be described later with reference to FIGS. 3 and 4.

The reader 44 reads from the external storage medium control information indicating whether the content stored in the external storage medium installed in the player is access-restricted. If the control information specifies that the content stored in the external storage medium corresponding to the medium icon in focus be access-restricted, the image generator 110 refers to the restriction configuration data stored in the storage 80. If the restriction configuration data specifies a level of activation of access restriction, the image generator 110 displays a dialog prompting the user to enter a password necessary to lift access restriction. An associated menu item image is displayed on the condition that the correct password is entered by the user. There are cases where not only the content itself but also the menu item image indicating the content is inappropriate for users of certain age or younger to access. By restricting the access to even a menu item image, the method according to the embodiment ensures effectiveness of access restriction. The password once entered remains valid until the device stops reproducing the content. When the on-screen menu is invoked thereafter, a dialog requesting a password is displayed again.

The game running module 82 runs a game program read from the small optical disk 70 or the memory card 72 by the disk controller 88 or the memory card controller 89. In accordance with the user's instruction acquired by the control 40, the game running module 82 processes operations related to the game program and sends game images and audio to the display module 30.

Figure 3:
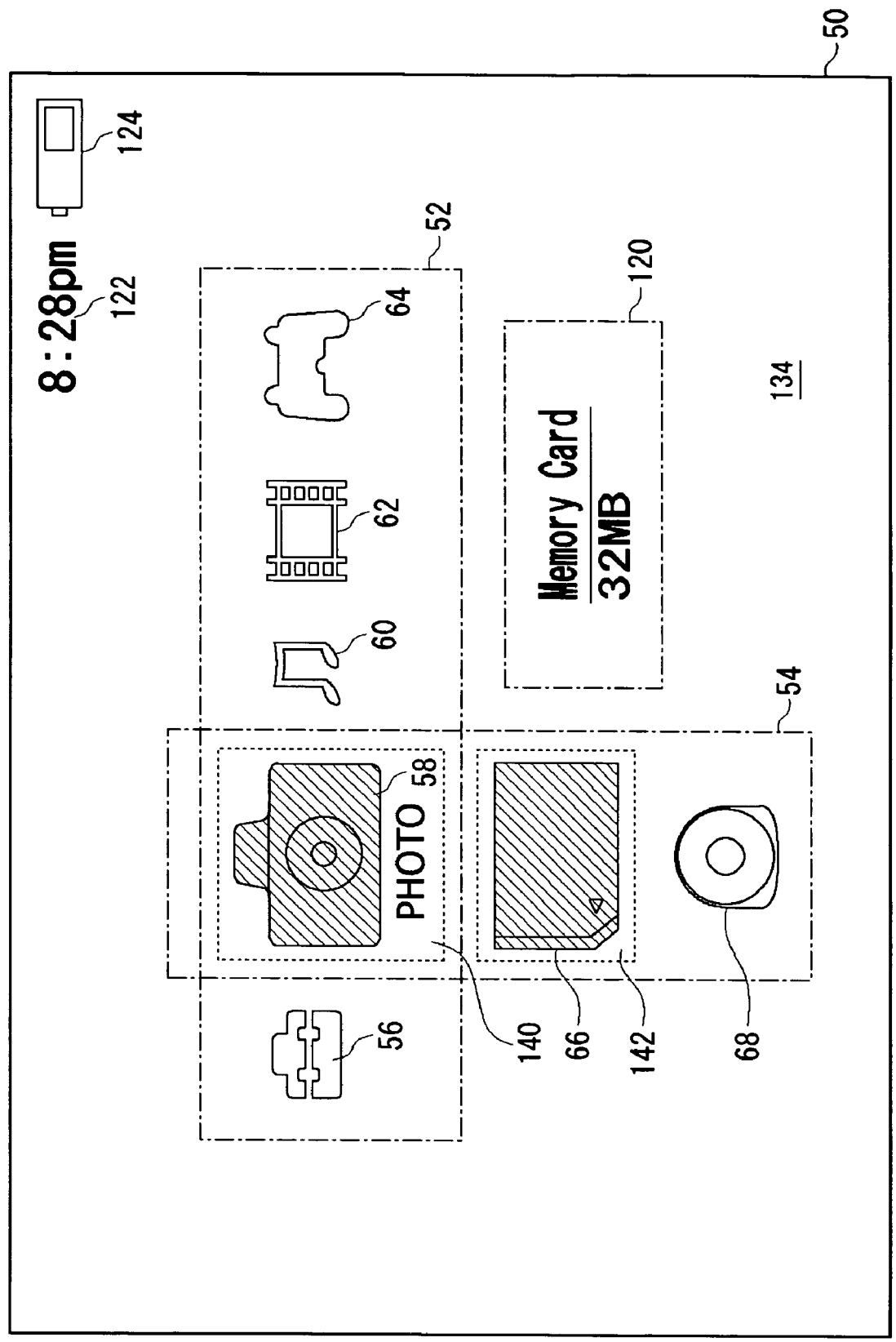
FIG. 3 shows an example of an on-screen menu in which an expanded view of an array of multiple medium icons is shown.
Figure 4:
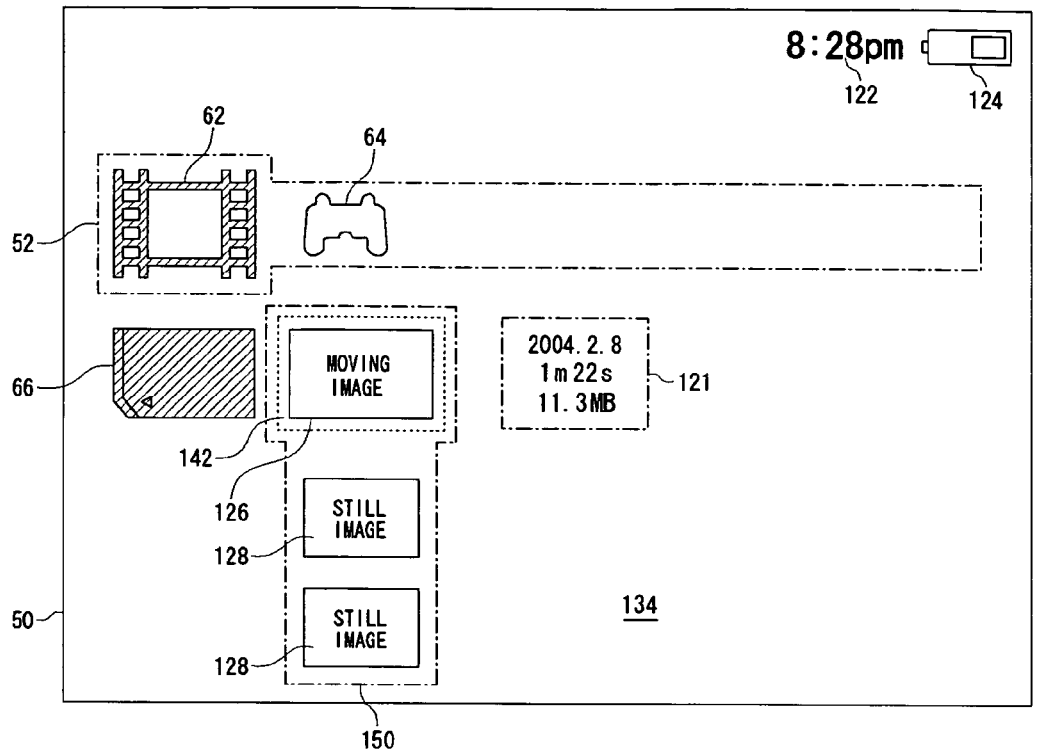
FIG. 4 is an example of an on-screen menu in which an expanded view of multiple content icons are shown adjacent to a memory card icon.
Figure 5:
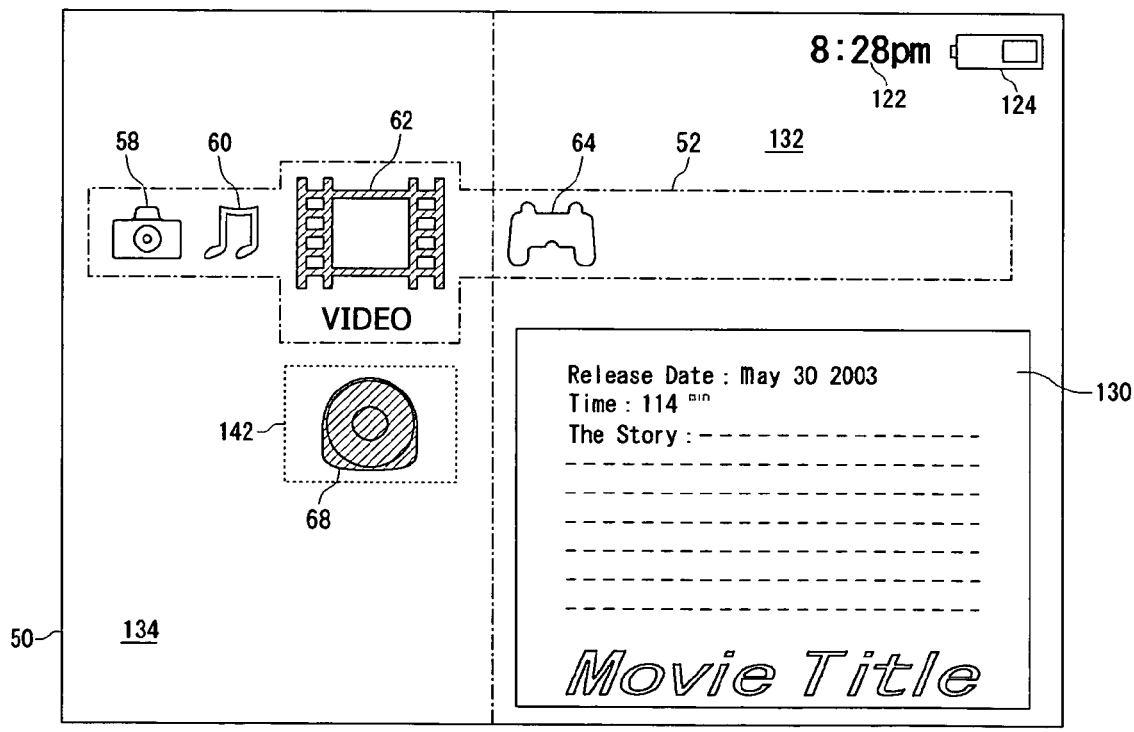
FIG. 5 show a state in which a menu item image is displayed and an expanded view of content icons are yet to be shown adjacent to a small optical disk icon.
Figure 6:
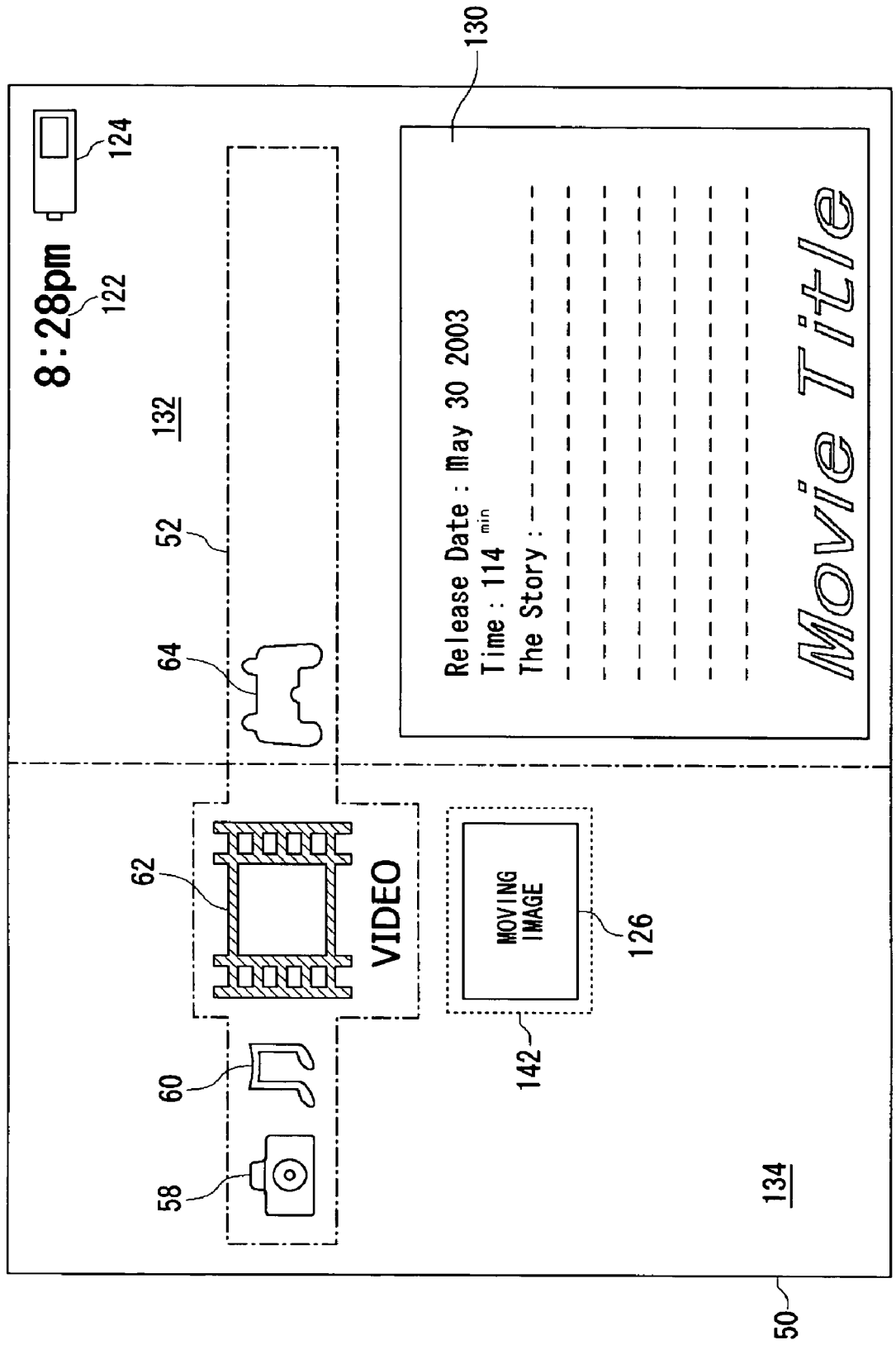
FIG. 6 shows a state in which a menu item image is displayed and an expanded view of content icons is shown adjacent to a small optical disk icon.

FIG. 3 shows an example of an on-screen menu in which an expanded view of an array of multiple medium icons is shown. FIG. 4 is an example of an on-screen menu in which an expanded view of multiple content icons are shown adjacent to the memory card icon. FIG. 5 is a state in which a menu item image is displayed and an expanded view of content icons are yet to be shown adjacent to the small optical disk icon. FIG. 6 shows a state in which an expanded view of content icons is shown adjacent to the small optical disk icon.

Figure 7:
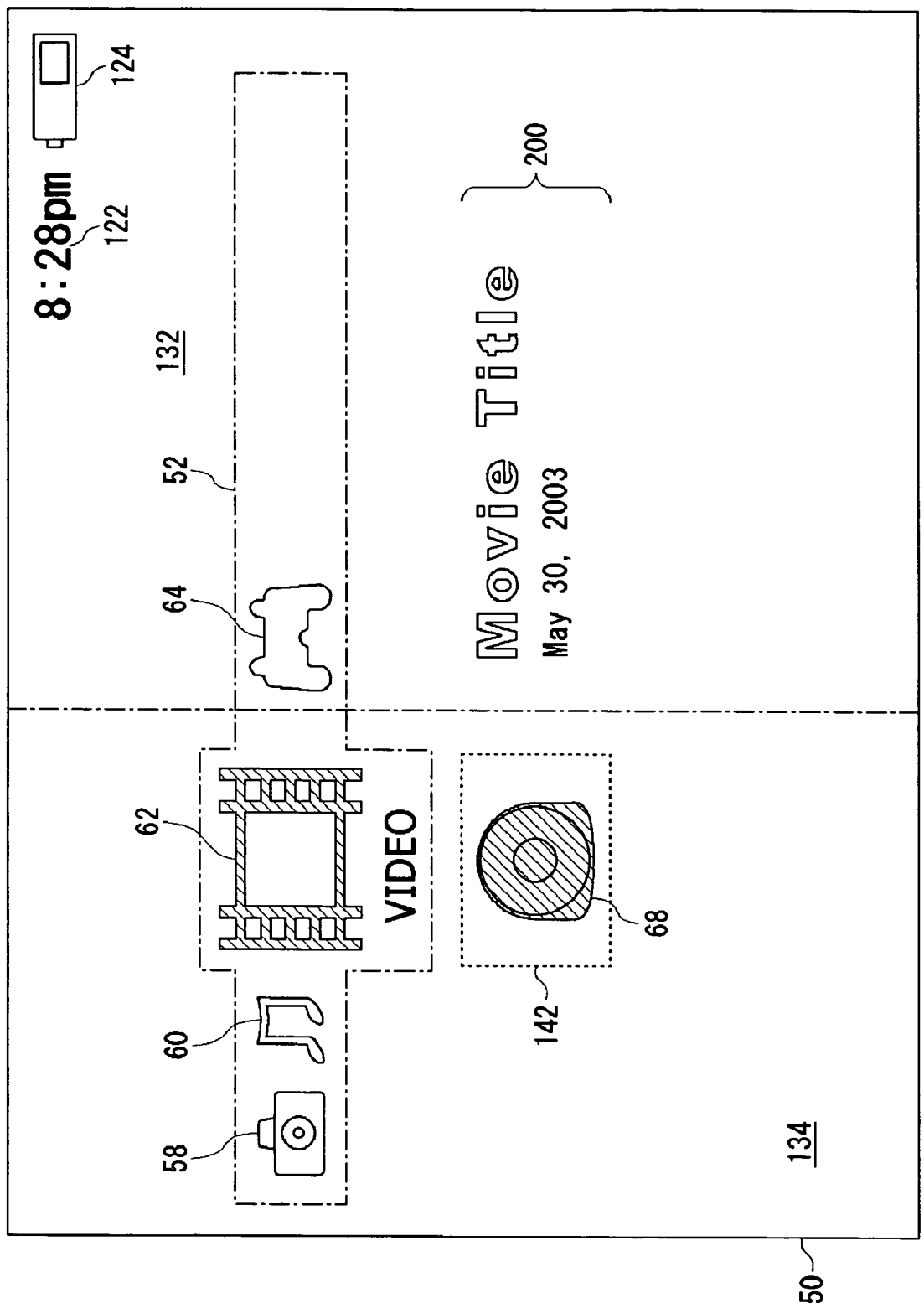
FIG. 7 shows a state in which a content description is shown instead of a menu item image.

FIG. 7 shows a state in which a content description is shown instead of a menu item image. The on-screen items in FIG. 3 through FIG. 7 will now be described in the stated order. In an on-screen menu 50, there is displayed a two-dimensional array in which intersect an array of function icons 52 in which multiple function icons are arranged horizontally and an array of medium icons 54 in which multiple medium icons are arranged vertically. The array of function icons 52 include icons representing the types of functions that the multimedia player 10 is provided with. The array includes a configuration function icon 56, a photo playback function icon 58, a music playback function icon 60, a moving image playback function icon 62 and a game running function icon 64. The array of medium icons 54 includes medium icons such as a memory card icon 66, an optical disk icon 68 and the like. The on-screen menu 50 comprised of the array of function icons 52 and the array of medium icons 54 is presented as on-screen display. Normally, the menu is superimposed on a background image called a wallpaper. Alternatively, the menu may be superimposed as a foreground of the content as it is being reproduced. In case a content image being reproduced is displayed in the background, the effect processor 108 may apply color to areas where the array of function icons 52 and the array of medium icons 54 are displayed to distinguish the areas from the background area. Distinction in appearance may be effected by other methods including adjusting brightness of the content image. The effect processor 108 displays a background image in a color that reflects the current month or season. The effect processor 108 maintains correspondence between months and colors/background images.

The function icon located at the intersection 140 of the array of function icons 52 and the array of medium icons 54 (hereinafter, referred to as an area of intersection) is a focus of attention currently selected by the user and is highlighted by a color different from that of the other function icons and by an enlarged view. In FIG. 3, the photo playback function icon 58 is highlighted as a focus of attention. The area of intersection 140 is made to remain fixed practically at the center of the on-screen menu 50. The entirety of the array of function icons 52 is moved left or right in accordance with the user's instruction via the control 40 to move left or right. As the array is moved, the color and size of the function icon located in the area of intersection 140 change. The user can select a desired playback function merely by specifying left or right.

The effect processor 108 moves the function icons left or right by scrolling the entirety of the array of function icons 52 left or right. The effect processor 108 may use carousel scrolling to display multiple function icons included in the array 52. In this case, the user can display all function icons in sequence practically at the center of the on-screen menu 50 by continuing to specify left or right. The effect processor 108 displays the function icons in the same color and same size as they are moved left or right. When one of the function icons is located at the area of intersection 140, the effect processor 108 changes the color and size of the function icon and displays the function name such as "photo" below the function icon. The effect processor 108 may change such attributes as brightness, chroma, hue, etc. of the function icon. Alternatively, the color may be changed by allowing the icon to flash. By displaying the function icon located in the area of intersection 140 in a display format different from that of the other function icons, the user can intuitively know the focus of attention.

When the function icons are being moved left or right and none of the function icons is being located in the area of intersection 140, the effect processor 108 does not display the array of medium icons 54. When one of the function icons is located in the area of intersection 140, the effect processor 108 shows an expanded view of the vertical array of medium icons 54 below the area of intersection 140. The user can show an expanded view of the array of medium icons 54 corresponding to the function merely by scrolling the function icons left or right as the user keeps his or her focus of attention on the area of intersection 140. When there is an instruction to move left or right while the array of medium icons 54 is being displayed, the effect processor 108 allows the expanded view of the array of medium icons 54 to collapse toward the area of intersection 140.

An area in focus of attention (hereinafter, simply referred to as an area in focus) 142 is an area where the medium icon of an external storage medium subject to the user's manipulation is displayed. The area in focus 142 is placed practically at the center of the on-screen menu 50. The image processor 110 displays the array of medium icons 54 such that the area of intersection 140 is located in the neighborhood of the area in focus 142, i.e., immediately above the area in focus 142. The area in focus 142 constitutes the array of medium icons 54. The effect processor 108 displays an enlarged version of the medium icon located in the area in focus 142 (in the case of FIG. 3, the memory card icon 66) so as to highlight it as a focus of attention. The small optical disk icon 68 not highlighted is displayed in smaller size than the memory card icon 66 highlighted.

While the control 40 acquires a user's instruction to move up or down, the medium icon is moved up or down in accordance with the instruction. The effect processor 108 moves the medium icons up or down by scrolling the entirety of the array of medium icons 54 up or down. The effect processor 108 may use carousel scrolling to display medium icons included in the array 54. In this case, the user can display all medium icons in the on-screen menu 50 in sequence by continuing to specify up or down. If the user specifies a diagonal direction via the control 40, the control 40 regards it as an upward or downward direction so that scroll of the array of medium icons 54 is given priority. This prevents false operation in which the array of function icons 52 is unintentionally scrolled left or right while the user is scrolling the array of medium icons 54.

The effect processor 108 may display the medium icons in the same size as they are moved up or down quickly and enlarge one of the medium icons when it settled in the area in focus 142 as the up or down scroll is terminated. Alternatively, the effect processor 108 may highlight a medium icon by enlarging as it passes through the area in focus 142. The effect processor 108 may vary such attributes as brightness, chroma, hue, etc. of the medium icon located in the area in focus 142. Alternatively, the effect processor 108 may make the medium icon to flash. When the medium icon located in the area in focus 142 is displayed enlarged, a medium description 120 describing the attribute related to the storage medium in focus is displayed in the neighborhood of the icon. More specifically, the attribute is displayed to the right of the icon. Referring to FIG. 3, a character string "Memory Card" identifying the storage medium and a character string "32 MB" indicating its capacity are displayed to the right of the memory card icon 66 in focus. The medium description 120 includes a prepared text such as the name of the storage medium and detected information such as the capacity of the storage medium. The image generator 110 displays the array of function icons 52 slightly above the vertical center of the on-screen menu 50 and displays the array of medium icons 54 slightly to the left of the horizontal center of the on-screen menu 50. This ensures that a set of the medium icon located in the area in focus 142 and the medium description 120 is displayed practically at the center of the on-screen menu 50. The user can easily view and know the attribute of the storage medium at the center of the on-screen menu 50.

In the storage medium in focus is the memory card 72, the effect processor 108 displays the on-screen menu as shown in FIG. 4 after displaying the medium description 120. More specifically, when the control 40 acquires a user's instruction to select the memory card icon 66, the effect processor 108 displays content icons representing the contents stored in the memory card 72 in the area in focus 142. If there are multiple contents stored in the memory card 72, multiple content icons are displayed in the area in focus 142 and below, with the result that a vertical array of content icons 150 is displayed. The memory card icon 66 remains displayed in the area in focus 142 until the control 40 acquires an instruction to select the memory card icon 66. When the control 40 acquires an instruction for selection, the effect processor 108 moves the memory card icon 66 one step to the left to leave the area in focus 142. In this process, the effect processor 108 moves the array of function icons 52 one step to the left in synchronization with the movement of the memory card icon 66 to the left.

The array of content icons 150 includes content icons in a moving image format and content icons in a still image format. The effect processor 108 shows the content icon located in the area in focus 142 in an enlarged format and in a moving image format. The effect processor 108 displays content icons located outside the area in focus 142 in a normal size and in a still image format. In the example shown in FIG. 4, a moving image icon 126 is displayed in the area in focus 142 and two still image icons 128 are displayed in the area outside.

The content icon located in the area in focus 142 is presented by playing back a moving image outputting corresponding sound. If the medium stores a moving image file and a corresponding audio file, the audio file is played back. In this case, even if audio data is included in the moving image file, the audio data is not reproduced. If the medium does not store a corresponding audio file in addition to the moving image file, and if audio data is included in the moving image file, then the audio data is reproduced. No audio output is provided if the medium does not store a corresponding audio file in addition to the moving image file and if the moving image file does not include audio data. Even if a corresponding audio file is stored in addition to the moving image file or if audio data is included in the moving image file, the audio file corresponding to the moving image file or the audio data in the moving image file is not played back when playback of music is already started. For example, when the user returns to the on-screen menu 50 by giving an instruction while music is being played, music being played back in the background remains output. The above process avoids a situation in which multiple sounds are simultaneously output. Normally, decoding of moving image data requires a longer period of time than decoding of audio data. Therefore, if an icon is for a loop of moving image with a relatively short playback time, instantaneous interruption in display or sound may occur in a jump from a loop end to a loop start due to a delay in decoding. This is addressed by separating the moving image file from the audio file. By playing back these files independently, occurrence of instantaneous silence is at least avoided. If audio data only is stored and a moving image file is absent, only the audio data is played back. Therefore, a content supplier can present a content icon using a combination of a still image and sound.

When the control 40 acquires an instruction to move up or down, the effect processor 108 moves the array of content icons 150 vertically in accordance with the user's instruction to move up or down and highlights the content located in the area in focus 142 in an enlarged moving image format. Thus, it is ensured that the content icon in focus is highlighted by being displayed in a format different from that of the other content icons. In addition, the content icon in focus is always displayed practically at the center of the screen. Accordingly, it is easy to direct the user's attention to a single content icon. A content description 121 is displayed to the right of the area in focus 142. The content description 121 includes information such as a date of production of content, playback time, data size, etc.

If the small optical disk 70 is a storage medium in focus, the effect processor 108 changes from the menu of FIG. 5 to that of FIG. 6 after displaying the medium description 120 for several seconds.

More specifically, the effect processor 108 displays the moving image icon 126 such that it slides into the area in focus 142 from left or from right, while the small optical disk icon 68 is being displayed in the area in focus 142 as shown in FIG. 5. The effect processor 108 then causes the moving image icon 126 to halt in the area in focus 142 as shown in FIG. 6. If multiple contents are stored in the small optical disk 70, the small optical disk icon 68 and the array of function icons 52 may be moved left so as to allow the area in focus 142 to be occupied by the array of content icons 150, as shown in FIG. 4.

If the small optical disk 70 or the memory card 72 stores a menu item image, the menu item image is displayed in the on-screen menu 50 as shown in FIGS. 5 and 6. Referring to FIGS. 5 and 6, a foreground image 130, a first background image 132 and a second background image 134 are displayed as a menu item image in such a manner that these images are blended with the array of function icons 52 and the array of content icons 150. The foreground image 130 is an image showing the title, date of production, playback time and description of the content. The foreground image 130 is designed freely by a content producer and is stored with a prescribed file name in a predetermined area in the small optical disk 70 or the memory card 72. The foreground image 130 is an image of a size that does not interfere with the array of function icons 52. As shown in FIGS. 5 and 6, the foreground image 130 is displayed so as not to overlap the array of function icons 52. The foreground image 130 of FIGS. 5 and 6 is an image showing summary information such as the title, release data, running time, story summary, etc. of a movie.

When a specific function icon is selected from the array of function icons 52 and a specific medium icon is selected from the array of medium icons 54, the effect processor 108 reads a menu item image from the selected storage medium. For example, when the moving playback function icon 62 is selected from the array of function icons 52 and the small optical disk icon 68 is selected from the array of medium icons 54, the effect processor 108 attempts to read a menu item image from the small optical disk 70. When the music playback function icon 60 is selected from the array of function icons 52 and the small optical disk icon 68 is selected from the array of medium icons 54, the effect processor 108 also attempts to read a menu item image from the small optical disk 70. When the game running function icon 64 is selected from the array of function icons 52 and the small optical disk icon 68 is selected from the array of medium icons 54, the effect processor 108 also reads a menu item image from the small optical disk 70.

If the effect processor 108 fails to read a menu item image from the small optical disk 70, i.e., when neither of the foreground image 130, the first background image 132 and the second background image 134 is read from the small optical disk 70, the effect processor 108 displays a content description 200 instead of menu item images, as shown in FIG. 7. For example, failure to read a menu item image from the small optical disk 70 may occur when the small optical disk 70 does not store the menu item image, or when reading of a menu item image from the small optical disk 70 fails due to some cause. The content description 200 is text information representing the content stored in the small optical disk 70 such as the title, disk product number, summary of the content, etc. The content description 200 is stored in a predetermined area in the small optical disk 70. If the effect processor 108 fails to read a menu item image from the small optical disk 70, the effect processor 108 reads the text information of the content description 200 from the small optical disk 70 and displays the content description 200 in the on-screen menu 50.

The first background image 132 is an image of a size that overlaps the array of function icons 52 in the background. As shown in FIGS. 5 and 6, the first background image 132 occupies almost half of the on-screen menu 50. The first background image 132 is displayed in the right half of the on-screen menu 50. The foreground image 130 is displayed in front in the lower half of the first background image 132. The array of function icons 52 is displayed in front and superimposed on the first background image 132 slightly above the center thereof. System information including the time 122 and battery remaining indicator 124 is located above the array 52. The design assumption is that the foreground image 130, the array of function icons 52 the time 122 and the battery remaining indicator 124 are superimposed in front of the first background image 132. The content producer designs a pattern and uses a design motif on that assumption. The first background image 132 is stored with a prescribed file name in a predetermined area in the small optical disk 70 or the memory card 72 and is displayed in the right half of the on-screen menu 50. The foreground image 130 and the first background image 132 may be created as an integrated single image. In this case, the title, date of production, playback time, description, etc. of the content, otherwise shown in the foreground image 130, are shown in the lower half of the first background image 132.

The second background image 134 occupies an area in the on-screen menu 50 executing the first background image 132. Like the first background image 132, the second background image 134 may be a wallpaper designed on an assumption that images are superimposed on the second background image 134. Alternatively, the image of the content currently played back may be displayed as the second background image 134. The second background image 134 appears also in FIGS. 3 and 4 as an image displayed in the background of the array of function icons 52, the array of content icons 150, the memory card icon 66 and the content description 121. The second background image 134 is displayed irrespective of the user's manipulation for selection of a content. As shown in FIGS. 5 and 6, selected function icons in the array of function icons 52, the small optical disk icon 68, the moving image icon 126, the foreground image 130, the first background image 132, the time 122 and the battery remaining indicator 124 are superimposed in front of the second background image 134. As described above, the first background image 132 and the second background image 134 are designed by a content producer on the assumption that they are displayed as a background that on which are superimposed system information and icons in the array of function icons 52 and the array of content icons 150. In order to display the first background image 132 in front of the second background image 134, an alpha value in alpha blending may be established for the first background image 132. In this case, the first background image 132 and the second background image 134 may be designed on the assumption that they are harmonized by alpha blending. This ensures that contents in focus can be displayed in the on-screen menu 50, using a variety of forms of visual presentation in accordance with the design of the foreground image 130, the first background image 132 and the second background image 134. Accordingly, the user can easily and intuitively know what the content items.

When the control 40 acquires an instruction to playback the content located in the area in focus 142 while the menu shown in FIG. 6 is being displayed, the content controller 106 places the image data for the on-screen menu 50 in a non-display mode and starts playing back the selected content. If the user invokes the on-screen menu via the home button 20 while the content is being played back, the on-screen menu is superimposed on the content being played back. The appearance of the menu that occurred when the content was selected is maintained in the on-screen menu thus displayed.

A description will now be given of the function icons shown in FIG. 3. The photo playback function icon 58 is an icon to be selected when playing back an photo image stored in the small optical disk 70 or the memory card 72. In a majority of cases, the image to be reproduced is a still image captured by a digital camera. Content icons displayed in an expanded view in the area in focus 142 and below are thumbnails of still images. The effect processor 108 may place the thumbnails in the array of content icons 150 as the still image icons 128. Alternatively, the effect processor 108 may show previews to the right of the area in focus 142 as part of the foreground image 130. The effect processor 108 may display photographic data such as the date and time that the image was taken, resolution etc., instead of displaying thumbnails as part of the foreground image 130.

The music playback function con 60 is an icon to be selected when playing back music data stored in the small optical disk 70 or the memory card 72. Content icons displayed in an expanded view in the area in focus 142 and below when the music playback function icon 60 is located in the area of intersection 140 may be in units of music pieces or in units of albums. The content icon may be a thumbnail of an album jacket. The foreground image 130 displayed by the effect processor 108 may show music-related information such as the album jacket, album title, music titles, playing time, etc. Alternatively, moving image data such as a promotional video for the music or a thumbnail thereof may be displayed.

The moving image playback function icon 62 is an icon to be selected to play back a moving image stored in the small optical disk 70 or the memory card 72. The moving image to be played back is a movie or a moving image captured by a digital camera and is encoded in a compression format. The foreground image 130 displayed is as shown in FIG. 6.

The game running function icon 64 is an icon to be selected when running (executing) a game program. The target of execution is a game program stored in the small optical disk 70 or the memory card 72. When the game running function icon 64 is located in the area of intersection 140, an expanded view of at least one content icon is shown in the area in focus 142 and below. To the right of the area in focus 142 is displayed an image representing the content corresponding to the content icon located in the area in focus 142. The content icon is a moving image or a still image depicting a character that appears in the game. The foreground image 130 shows the game title, date of release, character image, game summary, game progress, etc. The game progress is shown in the foreground image 130 by a game program in a predetermined data format, based upon data related to the progress in game stored in the memory card 72.

As described above, the multimedia player 10 displays the on-screen menu 50 comprising the array of function icons and one of the medium icon array and the content icon array. The array of function icons 52 and the array of medium icons 54 actually displayed each comprise a single line or a single row. By scrolling up, down, left or right, function icons and medium icons are displayed one after another. Therefore, an appearance of a large number of contents being displayed in a matrix over the entirety of the screen is given to the user. The user can select a content as if by focusing on a desired content while the user moves a matrix of a large number of contents as desired. Meanwhile, the number of icons actually displayed is relatively small so that a disorganized appearance is prevented. As such, the inventive method is favorable in displaying on a relatively small liquid crystal screen. The user can select one content after another merely by specifying up, down, left or right and so can enjoy comfortable and easy zapping. Since the area in focus 142 continues to be maintained practically at the center of the on-screen menu 50, the user can select a content as if by looking at a desired content through a window provided at the center of the on-screen menu 50. As it is not necessary for the user to look for the area in focus 142 in the on-screen menu 50, the inventive method offers an environment in which the user can navigate through the menu in a relaxed manner.

Figure 8:
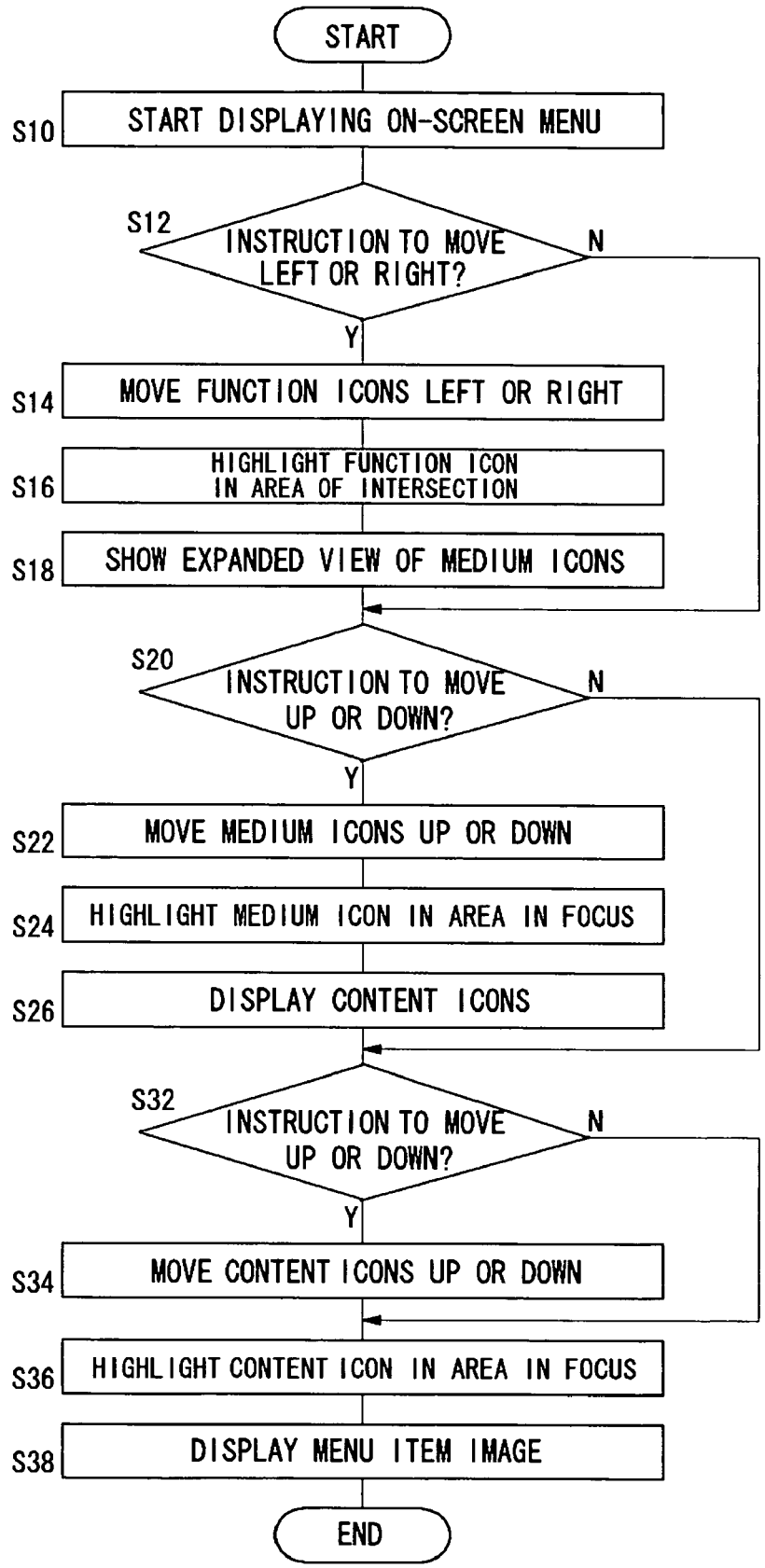
FIG. 8 is a flowchart showing the process of displaying an on-screen menu in a multimedia player.

FIG. 8 is a flowchart showing the process of displaying an on-screen menu in a multimedia player. When the user turns on the power of the multimedia player 10, the image generator 110 reads data such as function icons and medium icons from the storage 80 so as to generate the on-screen menu 50. The image generator 110 displays the menu 50 on the liquid crystal display 12 (S10). When the control 40 acquires an instruction to move left or right (S12Y) from the user, the effect processor 108 moves the function icons left or right in accordance with the instruction (S14) and highlights the function icon located in the area of intersection 140 (S16). Further, the effect processor 108 reads from the storage 80 the medium icons of the storage mediums storing the content corresponding to the highlighted function and shows an expanded view of the medium icons (S18). While there is not any instruction from the user to move left or right, steps S14-S18 are skipped (S12N).

When the control 40 acquires a user's instruction to move up or down while the expanded view of the medium icons is being shown (S20Y), the effect processor 108 moves the medium icons up or down in accordance with the instruction (S22), highlights the medium icon located in the area in focus 142 (S24) and displays associated content icons (S26). If the storage medium in focus is the memory card 72, the attribute of the memory card 72 is displayed to the right of the memory card icon 66 in S26. When there is an instruction from the user to select the memory card icon 66, the memory card icon 66 and the array of function icons 52 are move left to provide an expanded view of content icons in the area in focus 142 and below. If the storage medium in focus is the small optical disk 70, the attribute of the small optical disk 70 is displayed to the right for several seconds in S26, whereupon a content icon is superimposed on the small optical disk icon 68. While there is not any instruction from the user to move up or down in S20, steps S22-S30 are skipped (S20N).

If the control 40 acquires a user's instruction to move up or down while an expanded view of the content icons is shown (S32Y), the effect processor 108 moves the content icons up or down in accordance with the instruction (S34), highlights the content icon located in the area in focus 142 (S36) and displays a menu item image corresponding to the content (S38). If there is not any instruction from the user to move up or down, S34 is skipped (S32N). Steps S12-S38 are repeated until the control 40 acquires a user's instruction to playback the content.

Figure 9:
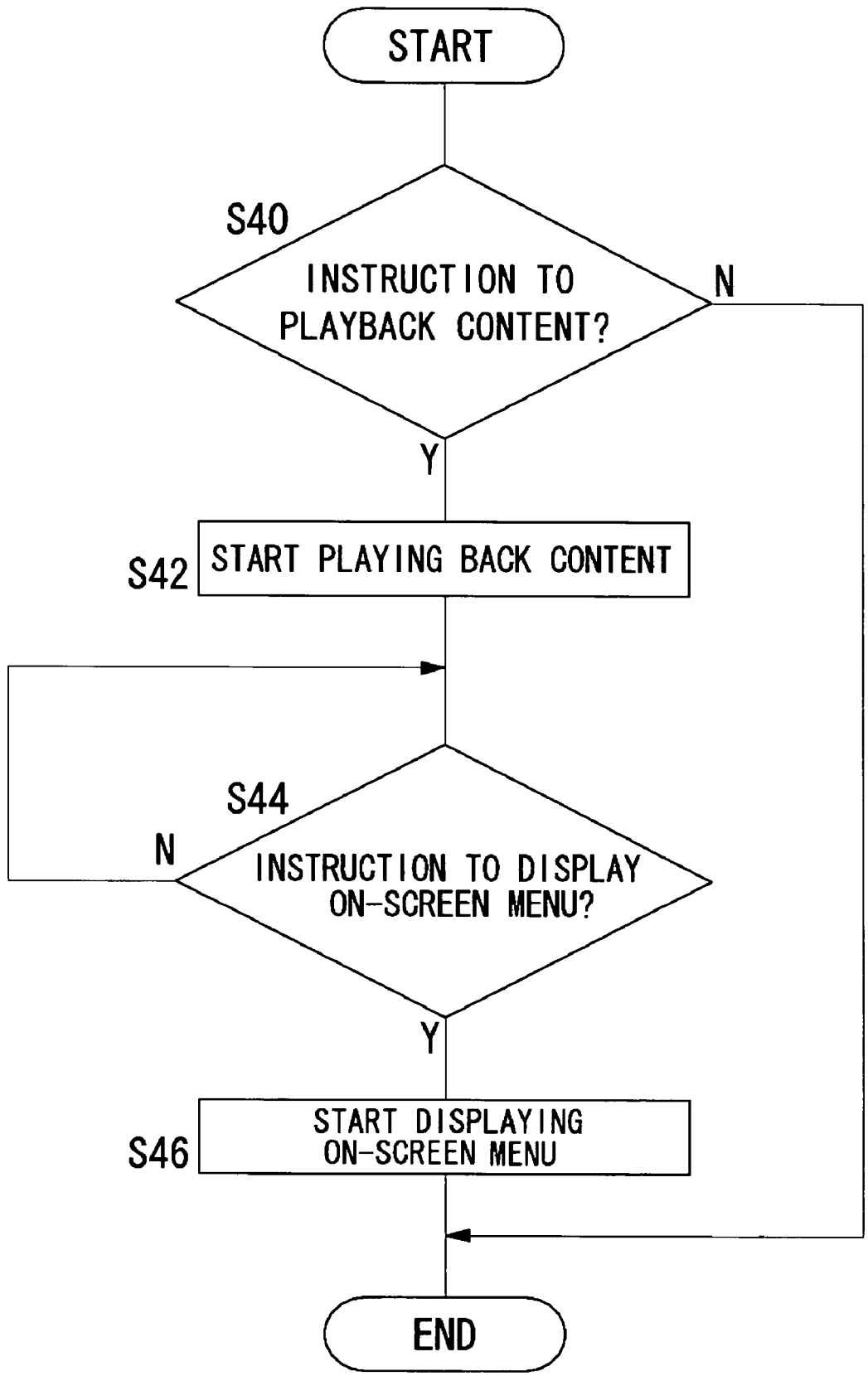
FIG. 9 is a flowchart showing how the multimedia player switches between content playback and display of an on-screen menu.

FIG. 9 is a flowchart showing how the multimedia player switches between content playback and display of an on-screen menu. If the control 40 acquires an instruction to playback a content (S40Y), the content controller 106 starts playing back the content highlighted in the area in focus 142 (S42). When the control 40 acquires a user's instruction to invoke the on-screen menu 50 while the content is being played back (S44Y), the on-screen menu starts to be displayed (S46). Absent the instruction to invoke the on-screen menu 50, the content continues to be played back (S44N). The process performed after the on-screen menu is started to be displayed is as shown in S12 and the subsequent steps of FIG. 5.

Figure 10:
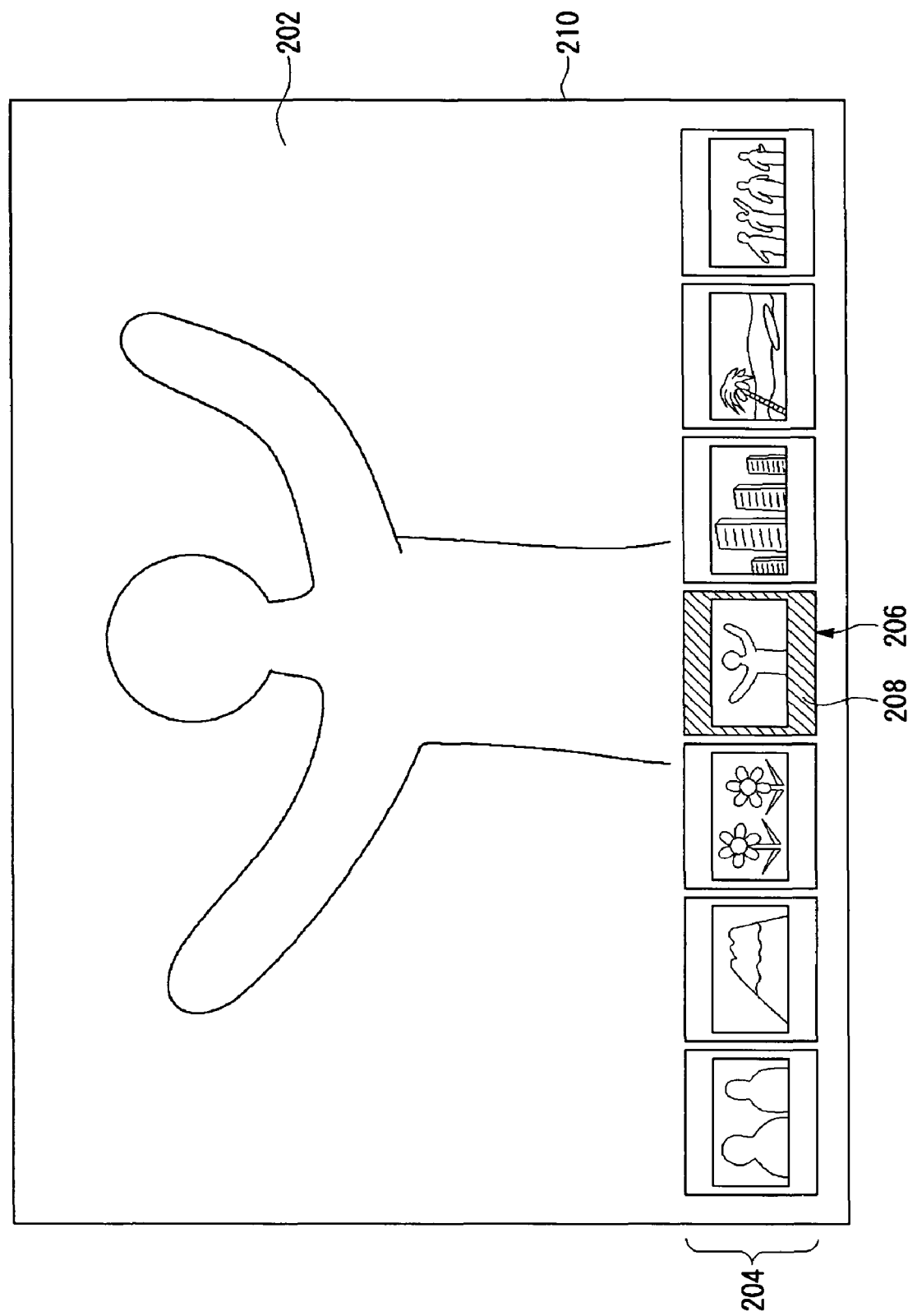
FIG. 10 shows an example of an image viewer screen.

FIG. 10 shows an example of an image viewer screen. An image viewer program is started when the photo playback function icon 58 is selected from the array of function icon 52 in the on-screen menu 50, when the memory card icon 66 is selected from the array of medium icons 54, when the still image icon 128 is selected from the array of content icons 150 and when an instruction to playback the content is given. After the image viewer program is started, the effect processor 108 displays a band-like horizontally-extending image selection area 204 in the lower part of an image viewer screen 210. The effect processor 108 reads thumbnails of multiple images stored in an exchangeable image file format (Exif) in the memory card 72. The effect processor 108 displays the multiple thumbnails in the image selection area 204, arranging them horizontally. Of the multiple images arranged horizontally, the image located at the center is an image in focus. The effect processor 108 displays a focus frame 208 around the image in focus in a focus area 206 at the center for displaying the image in focus. The focus frame 208 is displayed in a color that depends on the month of the year in which the image in focus was taken. More specifically, the effect processor 108 reads information indicating the date and time in which the image was taken from the multiple images stored in the Exif format, so as to determine the date and time in which the images were taken. The effect processor 108 displays the focus frame 208 in a color that depends on the month. For example, in July or August, the focus frame 208 may be displayed in a reddish color reminiscent of summer. In January and February, it may be displayed in a whitish color reminiscent of winter. The effect processor 108 maintains a table that defines correspondence between months and colors.

The effect processor 108 displays multiple images in a slide show style in the image viewer screen 210 by switching between images one after another at predetermined intervals. The effect processor 108 scrolls the multiple thumbnails arranged in the image selection area 204 in one direction at predetermined intervals. The effect processor 108 encircles the thumbnail located in the focus area 206 by the focus frame 208 and shows an enlarged view of the corresponding image in the image viewer screen 210. If the user specifies left or right by pressing the direction buttons 14, the effect processor 108 scrolls the multiple thumbnails arranged in the image selection area 204 in a direction specified by the user. The effect processor 108 encircles the thumbnail of the image in focus located in the focus area 206 by the focus frame 208. Since it is ensured that the image in focus is encircled by the focus frame 208 with a color corresponding to the month in which the image was taken, the user can visually and intuitively determine when the image was taken.

FIG. 10 shows an example where the image in focus is encircled by a color reflecting the month in which the image was taken in an image viewer screen. Alternatively, the effect processor 108 may encircle the moving image icon 126 and the still image icon 128, displayed in the area in focus 142 in the on-screen menu 50 of FIG. 4, with a color reflecting the month in which the image was taken. In one variation, the effect processor 108 may encircle content icons in the array of content icons 150 with focus frames colored according to the attribute such as genre (movie, music, etc.). In this case, the focus frame is given a color different from that of the background image.

Described above is a description of an illustrative embodiment. The embodiment is only illustrative in nature and it will be obvious to those skilled in the art that variations in constituting elements and processes are possible within the scope of the present invention. A description will now be given of variations.

In the described embodiment, the on-screen menu is designed such that the area of intersection 140 is located immediately above the area in focus 142. The on-screen menu may be designed such that the area of intersection 140 is located immediately below the area in focus 142 or in the neighborhood thereof, as long as the user can easily view the function icons without turning his or her eyes from the area in focus 142. In the described embodiment, the array of function icons 52 and the array of medium icons 54 are displayed horizontally and vertically, respectively, in the on-screen menu 50. In one variation, the array of function icons 52 and the array of medium icons 54 may be displayed diagonally.

In the described embodiment, the function icon, the medium icon and the content icon displayed in the area of intersection 140 or in the area in focus 142 are highlighted. In one variation, icons other than the function icon, the medium icon and the content icon, which are displayed in the area of intersection 140 or in the area in focus 142, are displayed with graded color change that occurs toward the edge of the on-screen menu 50, so that the icons in the center of the on-screen menu 50 are relatively highlighted. The graded color change may be a change in which brightness or chroma decreases toward the edge. Alternatively, the alpha value used for blending with the content image being played back in the background may be lowered toward the edge.

In the described embodiment, the on-screen menu 50 is designed such that the area of intersection 140 and the area in focus 142 are located practically in the center of the screen. In one variation, the display position of the area of intersection 140 and the area in focus 142 may be freely set by the user. While it is preferable that the display position of the area of intersection 140 and the area in focus 142 is practically in the center of the on-screen menu 50, the user may freely set the position according to preference.

Some other variations will be described. In the described embodiment, the user is allowed to select a function icon with left/right scroll. In one variation, a function icon may be selected according to a definitive instruction from the user. Similarly, instead of allowing the user to select a medium icon or a content icon with up/down scrolling as described in the embodiment, a medium icon or a content icon may be selected according to a definitive instruction from the user.

The on-screen menu in the described embodiment is designed such that the array of icons 52 is always displayed. In one variation, the on-screen menu may be designed such that at least one of the array of medium icons 54 and the array of content icons 150 is always displayed instead of displaying the array of function icons 52. Alternatively, the on-screen menu may be designed such that none of the array of function icons 52, the array of medium icons 54 and the array of content icons 150 is displayed. By only displaying a medium icon and a content icon in the area in focus 142, the user can easily know which media is being displayed. This allows the on-screen menu 50 to be designed according to the user's preference.

The on-screen menu in the described embodiment is designed such that only the medium icons of the storage mediums storing contents corresponding to the function icon located in the area of intersection 140 are displayed in the array of medium icons 54. In one variation, a matrix of a large number of medium icons or content icons may be displayed filling the whole of the on-screen menu 50. For example, medium icons representing storage mediums storing contents corresponding to all functions may be displayed, and, also, content icons representing such contents may be displayed. The brightness or chroma of the content icons displayed may be less than that of the array of medium icons 54.

In the described embodiment, the medium icons and function icons are moved left when an expanded view of content icons is shown. In one variation, the medium icons and the function icons may not be moved left. Instead, the content icons may be displayed where the medium icons were displayed.

The optical disk 70 or the memory card 72 may store a plurality of types of menu item images (for example, a plurality of types of foreground images 130) corresponding to respective languages. In this case, the image generator 110 reads from the small optical disk 70 or the memory card 72 the menu item image corresponding to the language for which the multimedia player 10 is configured. Similarly, a plurality of types of images respectively reflecting seasons may be prepared as a menu item image. In this case, the image generator 110 reads the menu item image reflecting the current season from the small optical disk 70 or the memory card 72 so as to create an on-screen menu.

In the described embodiment, the mobile multifunction device is taken as an example. In one variation, the invention may be applicable to digital devices other than those of mobile type, such as a personal computer.

In the described embodiment, the foreground image 130 is a relatively large image that does not interfere with the array of function icons 52. As shown in FIGS. 5 and 6, the foreground image 130 is displayed such that it does not overlap the array of function icons 52. In one variation, the foreground image 130 may be much like a background image. That is, the size of the foreground image 130 may match the size of the entirety on-screen menu 50. The first background image 132 and the second background image 134 may be implemented by a single background image integrally including element images and filling the entirety screen.

In the described embodiment, the medium icon of the small optical disk 70 or the memory card icon 72 installed in the multimedia player 10 is displayed in vertical alignment with the playback function corresponding to the content. For example, if a music album is stored in the small optical disk 70, the medium icon of the small optical disk 70 is displayed in vertical alignment with the music playback function icon 60. In one variation, the function icon with which the medium icon is vertically aligned may be determined in accordance with the genre to which the content stored in the small optical disk 70 belongs. For example, if a music album stored in the small optical disk 70 is an ordinary album, the medium icon is displayed in vertical alignment with the music playback function icon 60. If the album is a soundtrack album for a movie, the medium icon is displayed in vertical alignment with the moving image playback function icon 62. If the album is a soundtrack album for a game content, the medium icon is displayed in vertical alignment with the game running function icon 64. If moving image data stored in the small optical disk 70 is for an ordinary moving image, the medium icon is displayed in vertical alignment with the moving image playback function 62. If the moving image data is for a promotional video for a game, the medium icon is displayed in vertical alignment with the game running function icon 64. For determination of the location of display depending on the genre of the content stored in the external storage medium such as the small optical disk 70 or the memory card 72, data indicating the genre is stored in the external storage medium or the content. This allows the genre of each content to be detected irrespective of the type of playback function. Therefore, it is possible to determine an appropriate location of display.

What is claimed is:

1. A multimedia player capable of playing back digital contents, comprising:
    a control which acquire an instruction related to playback of a content via a user's instruction;
    a reader which reads the content from an external storage medium installed in the multimedia player to serve as an area for storing data for the content;
    a storage which stores data for a plurality of medium icons representing respective types of external storage mediums that can be installed in the multimedia player;
    a display processor which displays an on-screen menu related to playback of the content and processes playback of the content thus read; and
    a menu controller which generates image data for the on-screen menu which includes the plurality of medium icons, wherein
    the reader reads, from the external storage medium installed in the multimedia player, a menu item image visually representing a summary of the content stored in the external storage medium and including an image generated according to a rule where the size does not overlaps the array of icons included in the on-screen menu or the size matches the size of the entirety on-screen menu, and
    the menu controller visually highlights the medium icon which the user selected as a focus of attention, and displays the menu item image read from the external storage medium corresponding to the highlighted medium icon, in the on-screen menu.

2. The multimedia player according to claim 1, wherein the reader reads, from a predetermined area in the external storage medium installed in the multimedia player, the image with the size not overlapping the array of icons included in the on-screen menu or with the size matching the size of the entirety on-screen menu, as the menu item image, and
    the menu controller generates the image data for the on-screen menu by visually blending the menu item image with an array of medium icons.

3. The multimedia player according to claim 1, wherein the storage further stores data for a plurality of function icons representing respective types of playback functions for playing back respective types of contents,
    the menu controller generates the image data for the on-screen menu in which the plurality of function icons and the plurality of medium icons are arranged in a two-dimension array,
    the image generated according to the rule and read by the reader comprises a foreground image of a size that does not interfere with the array of function icons, and a background image on which is superimposed the array of functional icons, and
    the menu controller generates the image data for the on-screen menu by visually blending at least one of the foreground image and the background image with the array of function icons.

4. The multimedia player according to claim 1, wherein the reader reads, from the external storage medium installed in the multimedia player, a content icon representing a content stored in the external storage medium, and
    the menu controller places the content icon thus read at a position of the medium icon or in the adjoining area thereof.

5. The multimedia player according to claim 4, wherein the content icon read by the reader from the external storage medium installed in the multimedia player comprises an icon in a moving image format and an icon in a still image format, and
    the menu controller highlights the content icon in the moving image format as a focus of attention and does not highlight the content icon in the still image format.

6. The multimedia player according to claim 1, wherein the reader reads, from the external storage medium installed in the multimedia player, control information indicating whether the content stored in the external storage medium is access-restricted,
    the storage further stores user-configured restriction configuration data designating whether to activate access restriction, and
    if the control information specifies that the content stored in the external storage medium corresponding to the medium icon in focus be access-restricted, and if the restriction configuration data specifies activation of access restriction, the menu controller displays an associated menu item image on the condition that information necessary to lift access restriction is entered by the user.

7. A method of displaying an on-screen menu by an apparatus capable of playing back digital contents, comprising:
    reading a content from an external storage medium installed in the apparatus to serve as an area for storing data for the content played back in the apparatus;
    reading, from a predetermined storage, data for a plurality of medium icons representing respective types of external storage mediums that can be installed in the apparatus; and
    displaying an on-screen menu related to playback of the content and playing back the content read;
    generating image data for the on-screen menu which includes the plurality of medium icons, wherein
    the reading a content reads, from the external storage medium installed in the apparatus, a menu item image visually representing a summary of the content stored in the external storage medium and including an image generated according to a rule where the size does not overlaps the array of icons included in the on-screen menu or the size matches the size of the entirety on-screen menu, and
    the generating visually highlights the medium icon which the user selected as a focus of attention, and displays the menu item image read from the external storage medium corresponding to the highlighted medium icon, in the on-screen menu.

8. The method of displaying an on-screen menu according to claim 7, wherein the reading a content reads, from a predetermined area in the external storage medium installed in the apparatus, the image with the size not overlapping the array of icons included in the on-screen menu or with the size matching the size of the entirety on-screen menu, as the menu item image, and the generating generates the image data for the on-screen menu by visually blending the menu item image with an array of medium icons.

9. The method of displaying on-screen menu according to claim 7, wherein the reading from the predetermined storage further reads data for a plurality of function icons representing respective types of playback functions for playing back respective types of contents, the generating generates the image data for the on-screen menu in which the plurality of function icons and the plurality of medium icons are arranged in a two-dimension array, the image generated according to the rule and read in the reading a content comprises a foreground image of a size that does not interfere with the array of function icons, and a background image on which is superimposed the array of functional icons, and the generating further generates the image data for the on-screen menu by visually blending at least one of the foreground image and the background image with the array of function icons.

10. The method of displaying an on-screen menu according to claim 7, wherein the reading a content reads, from the external storage medium installed in the apparatus, a content icon representing a content stored in the external storage medium, and the generating places the content icon thus read at a position of the medium icon or in the adjoining area thereof.

11. The method of displaying an on-screen menu according to claim 10, wherein the content icon read from the external storage medium installed in the apparatus comprises an icon in a moving image format and an icon in a still image format, and the generating highlights the content icon in the moving image format as a focus of attention and does not highlight the content icon in the still image format.

12. The method of displaying an on-screen menu according to claim 7, wherein the reading a content reads, from the external storage medium installed in the apparatus, control information indicating whether the content stored in the external storage medium is access-restricted, the reading from a predetermined storage further reads user-configured restriction configuration data designating whether to activate access restriction, and if the control information specifies that the content stored in the external storage medium corresponding to the medium icon in focus be access-restricted, and if the restriction configuration data specifies activation of access restriction, the generating displays an associated menu item image on the condition that information necessary to lift access restriction is entered by the user.

13. A computer readable recording medium which stores a computer program product for displaying an on-screen menu by an apparatus capable of playing back digital contents, comprising:

an acquiring module which acquires an instruction related to playback of a content via a user's instruction;

a reading module which reads the content from an external storage medium installed in the apparatus to serve as an area for storing data for the content played back in the apparatus;

a storing module which stores data for a plurality of medium icons representing respective types of external storage mediums that can be installed in the apparatus; and a processing module which displays an on-screen menu related to playback of the content and plays back the content read;

a generating module which generates image data for the on-screen menu which includes the plurality of medium icons, wherein the reading module reads, from the external storage medium installed in the apparatus, a menu item image visually representing a summary of the content stored in the external storage medium and including an image generated according to a rule where the size does not overlaps the array of icons included in the on-screen menu or the size matches the size of the entirety on-screen menu, and the generating module visually highlights the medium icon which the user selected as a focus of attention, and displays the menu item image read from the external storage medium corresponding to the highlighted medium icon, in the on-screen menu.

14. The computer readable recording medium according to claim 13, wherein the reading module reads, from a predetermined area in the external storage medium installed in the apparatus, the image with the size not overlapping the array of icons included in the on-screen menu or with the size matching the size of the entirety on-screen menu as the menu item image, and the generating module generates the image data for the on-screen menu by visually blending the menu item image with an array of medium icons.

15. The computer readable recording medium according to claim 13, wherein the storing module further stores data for a plurality of function icons representing respective types of playback functions for playing back respective types of contents, the generating module generates the image data for the on-screen menu in which the plurality of function icons and the plurality of medium icons are arranged in a two-dimension array, the image generated according to the rule read by the reading module comprises a foreground image of a size that does not interfere with the array of function icons, and a background image on which is superimposed the array of functional icons, and the generating module further generates the image data for the on-screen menu by visually blending at least one of the foreground image and the background image with the array of function icons.

16. The computer readable recording medium according to claim 13, wherein the reading module reads, from the external storage medium installed in the apparatus, a content icon representing a content stored in the external storage medium, and the generating module places the content icon thus read at a position of the medium icon or in the adjoining area thereof.

17. The computer readable recording medium according to claim 16, wherein the content icon read from the external storage medium installed in the apparatus comprises an icon in a moving image format and an icon in a still image format, and the generating module highlights the content icon in the moving image format as a focus of attention and does not highlight the content icon in the still image format.

18. The computer readable recording medium according to claim 13, wherein the reading module reads, from the external storage medium installed in the apparatus, control information indicating whether the content stored in the external storage medium is access-restricted,
- the storing module further stores user-configured restriction configuration data designating whether to activate access restriction, and
- if the control information specifies that the content stored in the external storage medium corresponding to the medium icon in focus be access-restricted, and if the restriction configuration data specifies activation of access restriction, the generating module displays an associated menu item image on the condition that information necessary to lift access restriction is entered by the user.

19. The multimedia player according to claim 1, wherein the reader reads, from the external storage medium installed in the multimedia player, a content icon representing a content stored in the external storage medium, and
- the menu controller, after displaying the medium icon, replaces the medium icon with the content icon thus read.

20. The multimedia player according to claim 19, wherein the menu controller replaces the medium icon with the content icon by displaying the content icon such that it slides into the area in the medium icon while the medium icon is being displayed, and halting the content icon in the area where the medium icon has been displayed.

* * * * *